Sept. 11, 1951 C. N. HICKMAN 2,567,812

CODE TRANSMITTERS

Filed March 26, 1948 2 Sheets-Sheet 1

INVENTOR
C. N. HICKMAN
BY A. F. Kane
ATTORNEY

Sept. 11, 1951 C. N. HICKMAN 2,567,812

CODE TRANSMITTERS

Filed March 26, 1948 2 Sheets-Sheet 2

INVENTOR
C. N. HICKMAN
BY
A. J. Kane
ATTORNEY

Patented Sept. 11, 1951 2,567,812

UNITED STATES PATENT OFFICE 2,567,812

CODE TRANSMITTER

Clarence N. Hickman, Jackson Heights, N. Y., assignor to Bell Telephone Laboratories, Incorporated, New York, N. Y., a corporation of New York Application March 26, 1948, Serial No. 17,136

5 Claims. (Cl. 179—90)

This invention relates to call transmitters and particularly to key-controlled transmitters which generate alternating current impulses for use in characterizing telephone station designations.

Telephone systems which operate on the basis of keyed alternating current signals are systems in which the signals which identify a particular telephone station designation are impulses comprising coded combinations of frequencies. These impulses are produced either by a tone generator comprising a number of differently tuned reeds which can be simultaneously plucked in the required combination by digit-designating keys to induce the necessary frequencies in a pick-up coil interlinked with a magnetic field, or by the permutative application to the line of the required number of generators each individual to one of the frequencies. At the receiving end of the line these frequencies are received by suitable frequency-responsive apparatus which usually comprises a channel for each frequency that includes a filter network tuned to the frequency to be passed, an amplifier, a rectifier for changing the amplified frequency into direct current, and a sensitive direct current responsive relay, the momentary operation of which usually being registered in the storage devices of a switching control mechanism called a "sender." The sender subsequently controls the selective setting of switches which connect with the called line.

Telephone systems which operate on alternating current impulses have some advantages over those which operate on direct current impulses. One of the important advantages is faster "dialing," that is, the time required to transmit all the pulses which identify a station designation is greatly reduced so that the holding time on the senders is materially lessened. This serves not only to speed up telephone service but tends to reduce the number of senders required at a central office to serve a particular number of lines. Reed type generators, however, introduce some mechanical complexities in the design of the subscriber's telephone set which render the sets costly not only from a manufacturing standpoint but also from the viewpoint of maintenance.

It is the object of this invention to provide a call transmitter of the type capable of generating alternating current impulses, or tone signals suitable for controlling the operation of automatic telephone switches which is simple and reliable in operation, compact in structure and economical from manufacture and maintenance viewpoints.

The tone generator of this invention distinguishes from known generators employed for similar purposes in that its basic design involves the principle of magnetic recording. That is, each of the digits, or characters of a telephone designation is magnetically symbolized on a magnetic recording medium incident to the manual operation of a digital or numerical key corresponding to such digit or character, and the magnetic recordings are subsequently translated and transmitted to the central office as alternating current impulses.

A particular feature of the invention contemplates the use of a plurality of radially magnetized gear magnets, each of which is provided with a different number of teeth and which, by means of manually operable keys are selectively brought into surface contact with the previously polarized periphery of a rotatable drum of magnetic material to alter the original polarized condition of the drum periphery in accordance with the patterns effected by the polarized gear teeth and thereby to differently symbolize, magnetically, the various characters of a station designation on the drum periphery.

Another feature of the invention resides in employing two differently patterned magnet gears for each of the ten possible characters of which a telephone designation may be constituted, thus rendering it possible for all ten digits, or characters to be accommodated by five gear magnets. An ancillary feature contemplates means for translating the actuation of a single numerical key into the effective, selective engagement of two of the gear magnets with the recording medium in accordance with predetermined codes.

A still further feature of the invention involves the use of mechanical means controlled by the manually operable numerical keys for rotatably advancing the recording drum in a manner such as to cause it to present successive peripheral segments thereof to the influence of two selectively operated gear magnets so that each of the characters of a station designation appears on a separate segment of the drum periphery as two tracks, each comprising increments magnetically polarized in accordance with the gear patterns of the gear magnets.

Still another feature of the invention contemplates the use of a single magnetic pick-up device which serves to successively translate the magnetic digital patterns imparted to the drum peripheral segments, into electric impulses of corresponding frequencies for transmission to the central office.

A further feature of the invention resides in the use of a synchronous motor for driving the recording medium during the signal transmitting period and in energizing the motor from a power source located at the central office under control of subset switchhook contacts.

These and other features of the invention will be better understood from the following detailed description when read with reference to the accompanying drawings in which.

Figure 1:
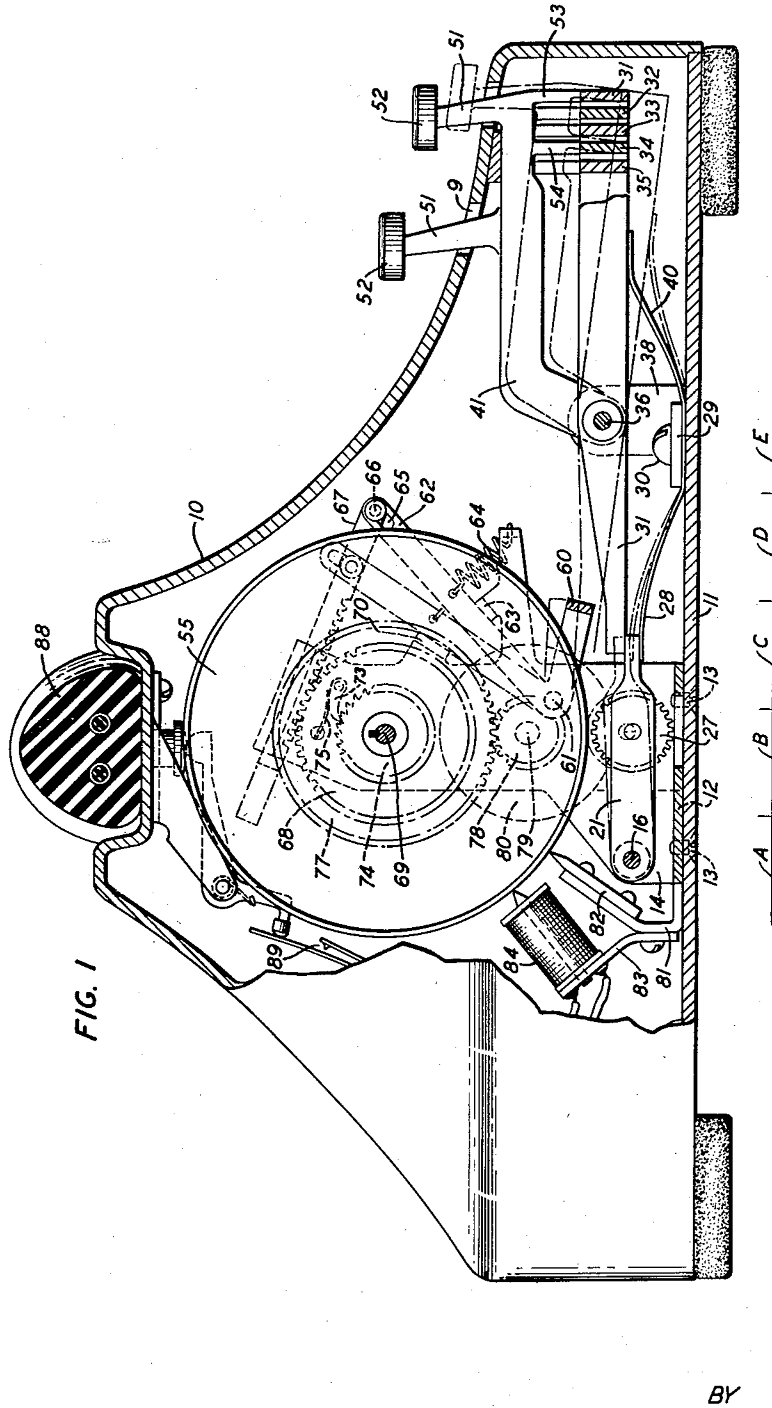
Fig. 1 is a side elevation of a telephone subset, partly in section, illustrating the key-controlled tone generator of this invention housed therein.

The telephone call transmitter, or tone generator of this invention is housed in the telephone set casing 10 and is carried on the base 11 thereof by means of a number of brackets, or supports. One such bracket is identified on the drawings by the numeral 12 and is secured to the base 11 by means of screws such as are shown at 13. This bracket has an overall U shape, the crosspiece 12 thereof being secured to the base 11 as described and the two vertical arms serving to mount various elements of the generator between them. These bracket arms are designated 14 and 15, respectively, on the drawings.

A rod 16 is horizontally supported in suitable apertures in the bracket arms 14 and 15 and furnishes a pivot about which five gear bars 17, 18, 19, 20 and 21 are adapted to be rotated through relatively small arcs. The bars 17 to 21, inclusive, are provided at their inner ends, or left ends viewing Figs. 1 and 2, with suitable holes through which the rod 16 extends. Suitable spacing sleeves, one of which is designated 22 in Fig. 2 are provided to space the gear bars one from another and from the vertical bracket arms 14 and 15.

Each gear bar rotatably supports a gear magnet near its outer or right end. These gear magnets 23, 24, 25, 26 and 27 are radially magnetized so that the center has a north pole and the periphery is a south pole. The forward end of each of the gear bars 17 to 21 inclusive rests upon a bowed spring 28 which is clamped to the base 11 of the housing 10 by means of a clamp plate 29 and suitable screws 30. The springs 28 are so tensioned as to tend to rotate the gear bars in a counter-clockwise direction but are normally prevented from so doing because of the engagement of each thereof by the inner end of a corresponding U bar. These U bars are designated 31, 32, 33, 34 and 35 and are pivotally mounted on a shaft or rod 36 which is supported by two vertical lugs 38 formed integrally with the base 11 of the housing 10. Suitable spacing sleeves 37 on the rod 36 are interposed between adjacent U bars and between the outer bars and the lugs 38. Springs 40 are provided for each of the U bars and function normally to maintain the inner ends thereof in engagement with corresponding magnet bars 17 to 21 inclusive. The springs 40 which engage the left arms of the U bars 31 to 35, inclusive, are shown as continuations of the springs 28.

Also mounted for pivotal movement on shaft 36 are ten key bars 41, 42, 43, 44, 45, 46, 47, 48, 49 and 50 which are also suitably spaced on the rod 36 by sleeves 37. Each key bar is provided with an integrally formed, substantially vertical projection 51 which supports a finger button 52 at its outer end. The casing 10 is provided with suitable apertures 9 through which the key portions 51 project. On the longer key bars 41, 43, 45, 47 and 49 the projections 51 are located at their outer ends whereas on the remaining key bars the corresponding button-supporting projections are located intermediate the two ends.

Figures 2, 4:
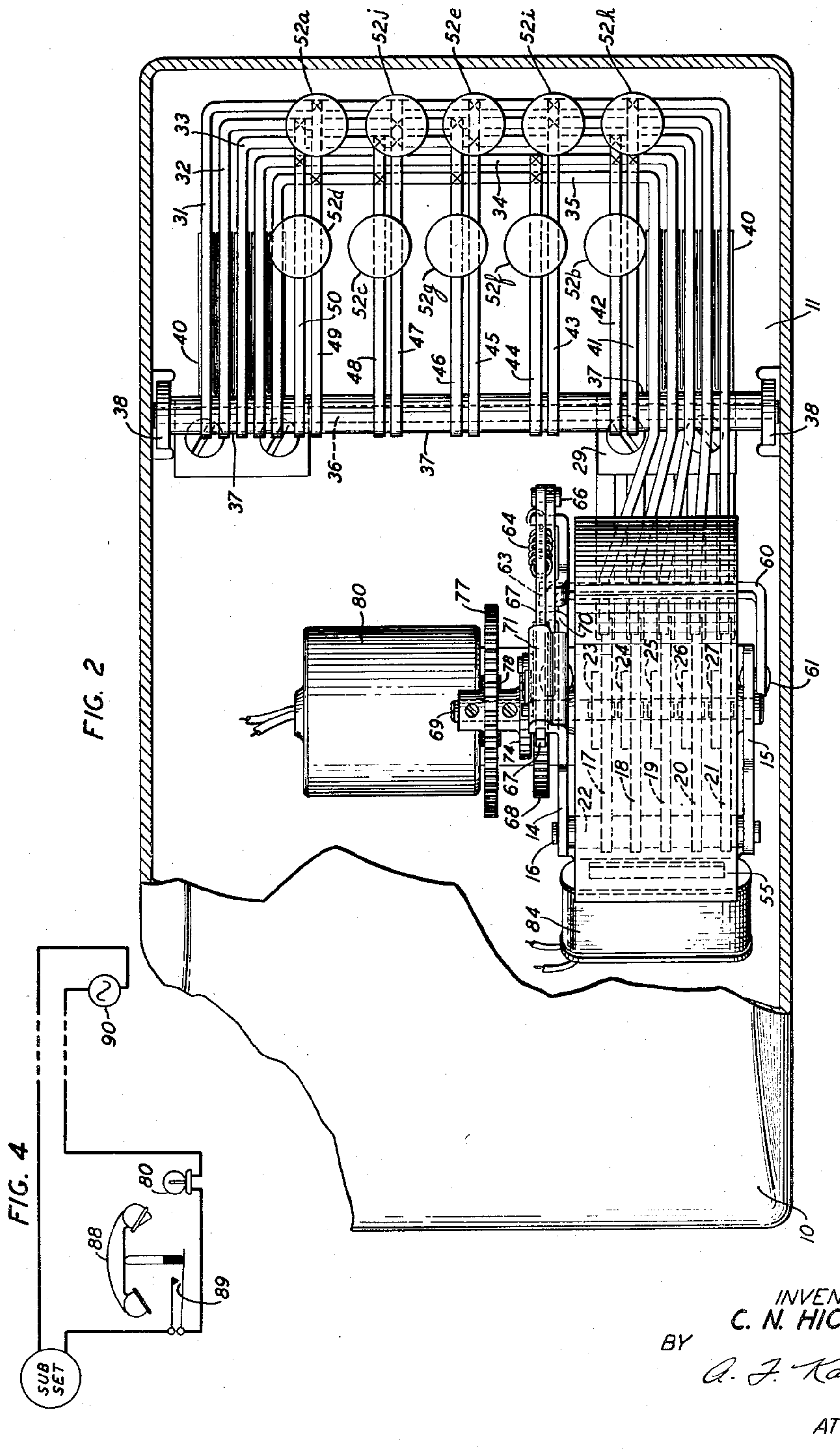
Fig. 2 is a view looking down on the generator and constitutes a plan view of the subset shown in elevation in Fig. 1.
Fig. 4 is a circuit diagram showing the manner in which the drum-driving motor is controlled by the swtchhook contacts.

The key bars extend over the U bars as shown in Fig. 2. Each portion of each key bar that overhangs the U bars is provided with two integrally formed depending projections such as 53 and 54. Each of these projections communicates with the upper edge of the transverse element of a U bar so that when pressure is applied to any finger button 52 and the corresponding key bar is rotated clockwise about the rod 36, two U bars are similarly rotated against the restraining influence of springs 40 and assume the positions indicated in broken line in Fig. 1. As will be described more fully hereinafter in connection with the operation of the call transmtter the operation of any one button in the manner described results in two gear magnets 23, 27, making peripheral contact with the drum 55, it being apparent that when the inner end of any U bar is raised incident to the depression of the corresponding finger button the corresponding gear bar is rotated counter-clockwise on shaft 16 under the influence of a spring 28.

A yoke piece 60 is pivotally mounted between opposite sides 14 and 15 of the mounting bracket by means of screw bolts 61, or their equivalents, and is provided with an integrally formed angularly disposed arm 62. The arm 62 which is normally biased against a stop bar 63, formed integrally with the mounting bracket, by coil spring 64 is provided at its outer end with a slot 65 which slidably accommodates a pin 66 fixed to the forward end of a rack 67. The rack 67, incident to a counter-clockwise movement of the yoke 60 and arm 62 moves linearly inwardly tangentially to a gear 68 which is freely mounted on a shaft 69. The teeth of the rack 67 are in constant mesh with the teeth of gear 68 and the rack itself is guided in its reciprocable linear movements by a slot formed in an integral, overhanging portion 71 of the bracket side 14. The extent to which the rack 67 may be moved inwardly is determined by the stop 70 which is formed integrally with the bracket side 14 and against which the bar, or link 62 impinges at the limit of its movement in a counter-clockwise direction.

The inner ends of the U bars 31, 32, 33, 34 and 35, as clearly shown in Fig. 2, are spread angularly to increase the spacing thereof at their inner or operating ends. These U bar ends are located below the yoke 60 so that the yoke is engaged thereby when the U bars respond to the depression of the key buttons 52 and is rotated counter-clockwise to actuate the gear rack 67 against the restraining influence of spring 64.

The gear 68 is provided with a pivotally mounted pawl 73 which is biased in the direction of a ratchet 74 by means of a leaf spring 75. The ratchet 74 is made fast to the shaft 69 in which the drum 55 also is fixedly mounted. The pawl 73 transmits the counter-clockwise rotational movement of gear 68 to the ratchet 74 and therefore to the drum 55 and at the same time permits clockwise rotation of the gear 68 relative to the ratchet 74. A gear 77 also fixed to shaft 69 is in constant mesh with a gear 78 fixed to the shaft 79 of a motor 80. The motor is mounted on a suitable block, or support fixed to the base 11 of the telephone set housing 10.

A permanent magnet 82 is mounted on an extension 81 of the mounting bracket and is of such dimensions as too present one end to substantially the entire peripheral width of the drum 55.

An auxiliary bracket 83 is fixed to the extension 81 and supports a magnetic pick-up device 84 comprising essentially an oblong coil and a substantially rectangular core having one end of substantially the same length as that of the permanent magnet end and located in substantial arcuate alignment therewith with respect to the periphery of the drum 55. The ends of the permanent magnet 82 and pick-up device 84 are located as close to the periphery of the drum 55 as manufacturing tolerances will allow.

The outer shell of the drum 55 is made of a suitable magnetic material. The polarity of the permanent magnet 82 is the reverse of that of the gear magnets 27, the pole nearest the drum being a north pole.

The motor 80, as schematically indicated in Fig. 4 is adapted to be energized by power supplied from the central office incident to the lifting of the telephone handset 88 from its support at the subscriber's station. For this purpose a set of contact springs 89 is provided, the springs of which close when the handset is lifted and open when the handset is replaced on its support. The closure of the contact springs 89 completes the electrical connection of the motor 80 to the subscriber's line to which the low frequency source 90 is connected preferably at the time dial tone is connected to the line in present practice.

The tone generator or telephone call transmitter operates in the following manner. For descriptive purpose it will be assumed that the mechanism is operated to effect the transmission of code signals which characterize the designation digits zero, one, four, five and eight, these being the digits which are shown magnetically symbolized on the drum periphery in Fig. 3.

To transmit the character "zero," finger button 52*a* (Fig. 2) is manually depressed causing U bars 31 and 35 to be rotated clockwise about the shaft 36, it being understood that the key bar 41 is provided with two depending projections such as 53 and 54 which communicate with the U bars 35 and 31 and through which these bars are actuated. The U bars with which the various key bar projections communicate are indicated by the small crosses in Fig. 2. The clockwise rotation of U bars 31 and 35 about the axis 36 causes the inner ends thereof to be raised against the restraining action of their individual flat springs 40 to thus enable corresponding flat springs 28 to rotate two corresponding gear bars 21 and 17 in counter-clockwise direction until their associated gear magnets 23 and 27 lightly contact the periphery of the drum 55.

Figure 3:
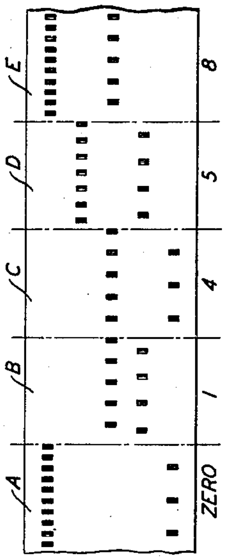
Fig. 3 is a schematic illustration of a section of the periphery of the signal drum showing, pictorially, various digit-characterizing magnetic patterns impressed thereon.

Each of the five gear magnets 23–27 has a different number of teeth per linear measure and as schematically illustrated in Fig. 3 gear magnets 27 and 23, which respond to the actuation of button 52*a* have ten and three teeth, respectively, per unit of linear measure.

As the inner ends of the U bars 31 and 35 move upwardly they engage the yoke 60 causing it to be rotated in a counter-clockwise direction about the axis 61. The rack 67, through the linkage 62 accordingly is moved inwardly until the linkage 62 contacts the stop 70 and causes the gear 68 to rotate counter-clockwise through an arc of substantially 36 degrees, it being understood that the tone generator is designed to accommodate ten digits, or designation characters. As the periphery of the magnetic drum 55 passes by the permanent magnet 82 it is magnetized or polarized in such a way that its outer shell has a south polarity. As this portion of the magnetized drum shell engages the gear magnets 27 and 23 the south pole teeth of the magnets will reverse the drum magnetization at the points of contact and the gear magnets will rotate with the drum. However, the space on the drum between the magnet teeth will be left relatively unchanged. Thus, incident to the actuation of button 52*a* there has been placed on the periphery of drum 55 two tracks with recorded magnetic intensities, the distance between the peaks corresponding to the spacing of the teeth on the respective gear magnets. These tracks are diagrammatically shown at A in Fig. 3. It makes no difference how fast a key button 52 is depressed. The magnetic spacings in the track will always correspond to the tooth pitch of the respective gear.

When the actuated button, or key 52*a* is released the springs 40 function to restore the U bars and the operated key bars to normal. The U bars in restoring, return the gear bars 21 and 17 to normal thus withdrawing the gear magnets 27 and 23 from engagement with the drum 55.

The key button 52*b* (Fig. 2) is next depressed to cause U bars 33 and 34 to rotate clockwise about the axis 36 and to raise their inner ends from the outer ends of gear bars 19 and 18, respectively, whereupon the springs 28 function to rotate these key bars counter-clockwise about the axis 16 until gear magnets 25 and 24 lightly contact the periphery of drum 55. As in the preceding case the drum 55 is rotated a second time through an arc of substantially 36 degrees and the corresponding portion of the drum periphery passes by the permanent magnet to be polarized negatively and then in contact with the rotatable gear magnets 25 and 24 to alter the polarization of the drum segment in accordance with the peripheral pattern of the gear magnets. The polarization pattern resulting from the actuation of key 52*b* is schematically indicated in Fig. 3 in the drum shell section designated B. Release of key 52*b* restores the apparatus to normal position except that the drum 55 remains in the position to which it has been advanced.

Key buttons 52*c*, 52*d* and 62*e* are then depressed sequentially causing U bars 33 and 35, 32 and 34, and 31 and 34, respectively, to be rotated about the axis 36 in groups of two and in the order of groups indicated. As each key is depressed the corresponding pair of gear magnets 25 and 23, 26 and 24, or 27 and 25 is brought into engagement with the shell of drum 55 and the drum is advanced one tenth of a revolution in the manner described above. The drum shell sections C, D and E are thus magnetically patterned as schematically shown in Fig. 3. The small dark rectangles in Fig. 3 symbolize positively poled areas on the drum periphery while the spaces between these areas are polarized negatively. Thus, each digit or character of a telephone designation may be represented on the drum periphery by two tracks, each comprising alternate positive and negative polarized areas or increments and each track covering in length one tenth the circumference of the drum. It is to be understood that the remaining digits 2, 3, 6, 7, and 9 may be magnetically symbolized on the periphery of drum 55 incident to the actuation of keys **52*f*, 52*g*, 52*h*, 52*i* and 52*j***, respectively, and each such character is differently patterned as two tracks of alternate positively and negatively polarized areas defined on the drum periphery by the teeth of corresponding gear magnets.

After having set up a number on the call transmitter by actuating a predetermined number of keys 52, depending upon the number of digits or characters in the designation, the calling subscriber lifts the handset 88 from its support. This operation closes switchhook contacts 89 (Fig. 4) to effectively include the synchronous motor 80 in the telephone line circuit. When the central office equipment is prepared to receive the signals a low frequency current source 90 is connected to the line to energize the motor 80. The motor then drives the drum 55 in a counterclockwise direction so that the signal-symbolized peripheral sections, or segments A, B, C, etc., thereof pass by the core of the magnetic pick-up device 84.

As the magnet tracks pass by the magnetic pick-up, two tones will be generated for each recorded segment and transmitted to the central office where, through suitable filters they are picked up for subsequent us in operating switching devices which serve to extend and complete telephone connections in well known manner.

The drum segments after passing the pick-up device 84 pass by the permanent magnet 82 so that the signal tracks are restored to their original condition—that is, the positive polarizations imparted to the drum periphery by the gear magnets are reversed so that the drum shell is again polarized negatively. Thus the signals impressed on the drum are effectively erased after having influenced the pick-up device 84.

It is understood that after the receipt of a predetermined number of signals at the central office the low frequency source 90 is disconnected from the line. If it is desirable to transmit only two or three, or some fraction of the whole of the pairs of tones the central office equipment will merely remove the low frequency current after having received the predetermined number of signals. The drum will then stop and wait until the central office again sends out the low frequency current, at which time, by means of the synchronous motor, the drum will continue its rotation.

By the tone generator of this invention, tone signals may be generated to permit reliable reception at the central office. By selecting frequencies which are all within one octave, the necessity of having pure sine wave tones is obviated. One of the important advantages derived from this tone generator resides in the fact that the generated signal voltage is constant throughout the transmission interval for any frequency.

It is understood that tone generators involving the features of the present invention may take various forms from mechanical design and operational viewpoints and the embodiment shown in the drawings is by way of illustration only. For example, the magnetic recordings may be made on a disc instead of a drum. In such a case the highest frequency gears would ride near the periphery of the disc while the lowest frequency gear would ride nearer the center. Also, if desirable, the apparatus may be designed to effect the disengagement of the motor from the drum during the setting of the designation transmitter thus lessening the load encountered by the subscriber in operating the various keys.

What is claimed is:

1. In a device for magnetically recording code signals on a rotatable magnetic recording element and for translating the recorded signals into corresponding electrical impulses, the combination in a telephone set, of a plurality of manually operable keys, means responsive to the operation of any of said keys for rotating said recording element through a predetermined arc, means effective during the rotation of said element for magnetically polarizing a segment of the periphery thereof corresponding in length to the arc through which said element is rotated, means also responsive to the operation of any of said keys for selectively reversing the polarization of the peripheral segment of said element in accordance with a predetermined pattern, a magnetic pick-up device disposed in close proximity to the periphery of said recording element, and means for rotating said recording element relative to said pick-up device.

2. The combination, in a telephone designation transmitter, of a unidirectionally polarized magnetic recording medium, a plurality of differently physically patterned permanent magnets, a plurality of manually operable digital keys, means responsive to the operation of any one of said keys for subjecting said recording medium to the influence of said permanent magnets selectively in predetermined combinations, a magnetic pick-up device for said recording medium, and means for moving said recording medium relative to said pick-up device.

3. The combination, in a telephone designation transmitter, of a magnetic recording medium, a plurality of differently physically patterned permanent magnets, a plurality of manually operable keys, a unidirectional magnetic field-producing means, means responsive to the operation of any of said keys for moving said recording medium in the magnetic field of said field-producing means and for simultaneously moving a predetermined combination of said permanent magnets into surface contact with said recording medium, a magnetic pick-up device, and means for moving said recording medium relative to said pick-up device.

4. The combination in a telephone designation transmitter of a rotatable magnetic recording medium, a plurality of gear type permanent magnets each having a different number of teeth, a plurality of manually operable keys, a unidirectional magnetic field-producing means, means responsive to the operation of any of said keys for causing said recording medium to be rotated through the magnetic field of said field-producing means for polarization thereby and to simultaneously move a predetermined combination of said gear type permanent magnets into surface contact with said recording medium whereby said gear magnets are rotated with said recording medium and alter the magnetic polarization thereof in accordance with the physical pattern effected by the teeth thereof, a magnetic pick-up device located in close proximity with said recording medium, and means other than said keys for rotating said recording medium relative to said magnetic pick-up device.

5. The combination in a telephone set of a code signal transmitter comprising a polarized magnetic recording medium, a plurality of differently physically patterned permanent magnets, a plurality of manually operable digital keys, means responsive to the operation of any one of said keys for subjecting said recording medium to the influence of said permanent magnets selectively in pairs whereby the digit corresponding to the digital key operated is magnetically symbolized on said recording medium in accordance with the physical patterns of the corresponding permanent magnets, a magnetic pick-up device, and means controlled by switchhook contacts of said telephone set for moving said recording medium relative to said pick-up device.

CLARENCE N. HICKMAN.

REFERENCES CITED

The following references are of record in the file of this patent:

UNITED STATES PATENTS

| Number | Name | Date |
|---|---|---|
| 2,080,918 | Tanschek | May 11, 1937 |
| 2,105,318 | Goldsmith | Jan. 11, 1938 |
| 2,298,519 | Tillman | Oct. 13, 1942 |
| 2,303,918 | Dimond | Dec. 1, 1942 |
| 2,329,466 | Goff | Sept. 14, 1943 |
| 2,436,829 | Roth | Mar. 2, 1948 |